(12) United States Patent
Jin et al.

(10) Patent No.: US 10,152,335 B2
(45) Date of Patent: Dec. 11, 2018

(54) SEAMLESS HOST SYSTEM GESTURE EXPERIENCE FOR GUEST APPLICATIONS ON TOUCH BASED DEVICES

(71) Applicant: Intel Corporation, Santa Clara, CA (US)

(72) Inventors: Yihua Jin, Shanghai (CN); Jianhui Li, Shanghai (CN); Tingtao Li, Shanghai (CN); Xiaodong Lin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/024,143

(22) PCT Filed: Nov. 15, 2013

(86) PCT No.: PCT/CN2013/087244
§ 371 (c)(1),
(2) Date: Mar. 23, 2016

(87) PCT Pub. No.: WO2015/070440
PCT Pub. Date: May 21, 2015

(65) Prior Publication Data
US 2016/0246609 A1 Aug. 25, 2016

(51) Int. Cl.
*G06F 9/445* (2018.01)
*G06F 9/44* (2018.01)
(Continued)

(52) U.S. Cl.
CPC .......... *G06F 9/445* (2013.01); *G06F 3/04883* (2013.01); *G06F 9/451* (2018.02); *G06F 9/45545* (2013.01)

(58) Field of Classification Search
CPC .... G06F 9/445; G06F 9/45545; G06F 9/4443; G06F 9/443; G06F 3/04883
See application file for complete search history.

(56) References Cited

U.S. PATENT DOCUMENTS 6,233,541 B1 5/2001 Butts et al.
8,686,959 B2 * 4/2014 Payne .................. G06F 3/0338
345/161
(Continued)

FOREIGN PATENT DOCUMENTS

CN 1220745 A 6/1999
CN 102591659 A 7/2012

OTHER PUBLICATIONS

International Search Report and Written Opinion received for International Application No. PCT/CN2013/087244, dated Sep. 2, 2014, 11 pages.
(Continued)

*Primary Examiner* — Charles R Kasenge
(74) *Attorney, Agent, or Firm* — Spectrum IP Law Group LLC

(57) ABSTRACT

Methods and apparatus relating to seamless host system gesture experience for guest applications on touch based devices are described. In an embodiment, Host Gesture Capture (HGC) logic detects a gesture in response to a touch event. The HGC logic forwards the gesture to Host Gesture Emulator (HGE) logic in response to a determination that the gesture is unrelated to an operation of a host system. The HGE logic operates in accordance with a guest operating system of the host system. Other embodiments are also claimed and described.

25 Claims, 6 Drawing Sheets

(51) Int. Cl.
*G06F 3/0488* (2013.01)
*G06F 9/451* (2018.01)
*G06F 9/455* (2018.01)

(56) References Cited

U.S. PATENT DOCUMENTS

| | | | | |
|---|---|---|---|---|
| 8,954,638 | B2* | 2/2015 | Davidson | G06F 9/4443 |
| | | | | 710/73 |
| 9,001,050 | B2* | 4/2015 | Tsirkin | G06F 9/45558 |
| | | | | 345/173 |
| 9,110,581 | B2* | 8/2015 | Momchilov | G06F 3/038 |
| 9,128,548 | B2* | 9/2015 | Davidson | G06F 3/041 |
| 9,250,854 | B2* | 2/2016 | Beveridge | G06F 3/1454 |
| 9,304,662 | B2* | 4/2016 | Beveridge | G06F 3/0484 |
| 9,542,080 | B2* | 1/2017 | Beveridge | G06F 3/0484 |
| 9,575,649 | B2* | 2/2017 | Wei | G06F 3/0488 |
| 2003/0093174 | A1* | 5/2003 | Nikulin | G05B 19/41885 |
| | | | | 700/121 |
| 2006/0094512 | A1* | 5/2006 | Yoshino | A63F 13/00 |
| | | | | 463/47 |
| 2006/0100021 | A1* | 5/2006 | Yoshino | A63F 13/00 |
| | | | | 463/45 |
| 2006/0111190 | A1* | 5/2006 | Yoshino | A63F 13/00 |
| | | | | 463/45 |
| 2007/0061126 | A1* | 3/2007 | Russo | G06F 3/03547 |
| | | | | 703/24 |
| 2007/0089111 | A1 | 4/2007 | Robinson et al. | |
| 2010/0214250 | A1* | 8/2010 | Gillespie | G06F 3/0481 |
| | | | | 345/173 |
| 2010/0275033 | A1* | 10/2010 | Gillespie | G06F 3/0481 |
| | | | | 713/182 |
| 2010/0275163 | A1* | 10/2010 | Gillespie | G06F 3/0481 |
| | | | | 715/810 |
| 2011/0092285 | A1* | 4/2011 | Yoshino | A63F 13/00 |
| | | | | 463/31 |
| 2011/0199325 | A1* | 8/2011 | Payne | G06F 3/0338 |
| | | | | 345/173 |
| 2011/0291964 | A1 | 12/2011 | Chambers et al. | |
| 2012/0013547 | A1* | 1/2012 | Tsirkin | G06F 9/45558 |
| | | | | 345/173 |
| 2012/0054671 | A1* | 3/2012 | Thompson | G06F 3/038 |
| | | | | 715/784 |
| 2012/0127206 | A1* | 5/2012 | Thompson | G06F 3/038 |
| | | | | 345/661 |
| 2013/0013547 | A1 | 1/2013 | Brown et al. | |
| 2013/0290856 | A1* | 10/2013 | Beveridge | G06F 3/1454 |
| | | | | 715/740 |
| 2013/0290857 | A1* | 10/2013 | Beveridge | G06F 3/0484 |
| | | | | 715/740 |
| 2013/0290858 | A1* | 10/2013 | Beveridge | G06F 3/0484 |
| | | | | 715/740 |
| 2014/0013234 | A1* | 1/2014 | Beveridge | G06F 3/0484 |
| | | | | 715/740 |
| 2014/0104190 | A1* | 4/2014 | Davidson | G06F 9/4443 |
| | | | | 345/173 |
| 2014/0104195 | A1* | 4/2014 | Davidson | G06F 3/041 |
| | | | | 345/173 |
| 2014/0320421 | A1* | 10/2014 | Wei | G06F 3/0488 |
| | | | | 345/173 |
| 2015/0346855 | A1* | 12/2015 | Momchilov | G06F 3/038 |
| | | | | 345/173 |

OTHER PUBLICATIONS

Communication received for European Patent Application No. 13897583.4, issued by the European Patent Office dated Jun. 22, 2016, 2 pages.
International Preliminary Report on Patentability received for International Application No. PCT/CN2013/087244, dated May 26, 2016, 6 pages.
Extended European Search Report received for European Patent Application No. 13897583.4, dated Jun. 6, 2017, 5 pages.
Office Action received for Chinese Patent Application No. 201380080271.6, dated Apr. 4, 2018, 20 pages including 13 pages of English translation.
Office Action received for Chinese Patent Application No. 201380080271.6, dated Oct. 24, 2018, 8 pages including 5 pages of English translation.

* cited by examiner

SEAMLESS HOST SYSTEM GESTURE EXPERIENCE FOR GUEST APPLICATIONS ON TOUCH BASED DEVICES

RELATED APPLICATIONS

The present application claims priority under 35 U.S.C. 371 to International Application No. PCT/CN2013/087244 filed on Nov. 15, 2013. Said Application No. PCT/CN2013/087244 is hereby incorporated herein by reference in its entirety

FIELD

The present disclosure generally relates to the field of computing. More particularly, an embodiment generally relates to seamless host system gesture experience for guest applications on touch based devices.

BACKGROUND

Touch based computing systems generally rely on system gestures to provide an easy way for a user to operate the touch based computing system. Some system gestures are related to system functions, such as invoking a system menu, returning to a host launcher, etc., while other system gestures may be related to applications, such as invoking an application menu, quitting the application, changing the foreground status from current application to next application, etc. However, as the type of touch based computing systems increases, so does the implementation complexity of system gestures. Accordingly, more efficient and seamless techniques are needed to implement system gestures on touch based computing systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware (FM), or some combination thereof.

Some embodiments provide seamless host system gesture experience for guest applications on touch based devices. For example, a user can utilize the host system gesture(s) to interact with both host and guest applications. Hence, a guest application is able to respond to host system gestures and deliver a seamless experience. In an embodiment, logic intercepts/recognizes one or more host system gestures, redirects them to a guest OS (Operating System), and/or emulates the responses. This allows for the users to apply host system gesture(s) to both guest and host applications and receive a similar or the same response. Furthermore, the touch based device could be any touch based device such as a device with a touch screen or other touch input device, including for example a smartphone, desktop computer (e.g., with a touch screen display or other touch input device), tablet, UMPC (Ultra-Mobile Personal Computer), laptop computer, Ultrabook™ computing device, smart watch, smart glasses, etc.

Moreover, system gestures provide an easy way to operate a touch based computing device. Some system gestures are related to system functions, such as invoking the system menu, returning to host launcher, etc., while other system gestures may be related to the applications, such as invoking an application menu, quitting the application, changing the foreground status from current application to next application, etc.

Furthermore, when guest applications are running on a host system, the guest applications generally run within a host application (referred to as an emulator), so a user can experience different effects when applying the system gestures to a guest application. For example, when a user tries to swipe from one guest application to another guest application, the swipe may skip all the guest applications and proceed to the next host application, or when a user invokes the guest application menu, the device may instead pop out the emulator's menu. Accordingly, system gestures may not be correctly recognized and may cause a host application to respond to host system gesture instead. This may in turn confuses a user when interacting with the guest applications using system gesture.

Figure 1:
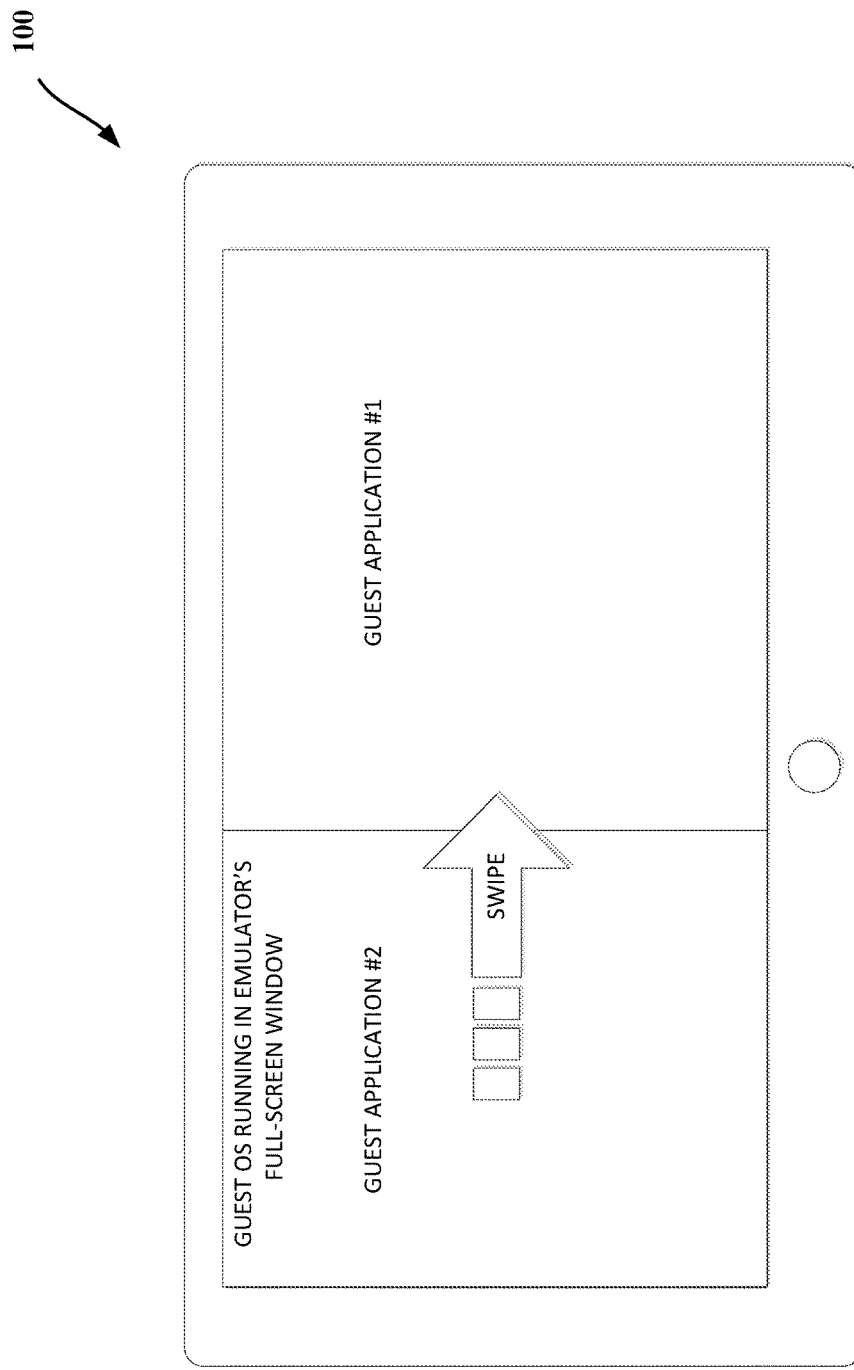
FIG. 1 illustrates a screen configuration on a device, according to an embodiment.

To this end, an embodiment utilizes logic to intercept/recognize one or more host system gestures, redirect them to a guest OS, and/or emulate the response(s). For example, FIG. 1 illustrates a screen configuration 100 on a device running a host OS and supporting swipe gesture to switch between guest applications, according to an embodiment. The device could be any touch based device such as a smartphone, desktop computer with a touch screen display, tablet, UMPC (Ultra-Mobile Personal Computer), laptop computer, Ultrabook™ computing device, smart watch, smart glasses, etc. Configuration 100 allows a system gesture (e.g., a swipe such as shown) to enable a user to switch between two guest application (e.g., illustrated as guest applications #1 and #2). In FIG. 1, the guest OS is running in an emulator's full screen window. Hence, with seamless gesture, guest applications can be switched with the same host swipe gesture in accordance with an embodiment.

In some implementations of an emulator, the emulator's Emulated Touch Device (ETD) logic redirects the host OS' touch events to the guest OS. Each time a touch event occurs inside emulator's application window (e.g., full screen), the ETD receives the touch event from host OS and then redirects the event to the event manager in the guest OS.

Such an implementation depends on the guest event manager to determine how to response to the event. Also, some system gestures may have already been processed (e.g., by the host OS) and thus not delivered to ETD at all. Moreover, the event manager may be implemented as a service, which receives the user input and dispatches it to the foreground application or another system component. The event manager may swipe from one application to the next one, quit the application, pop up application menu, or invoke the system menu, etc.

Figure 2:
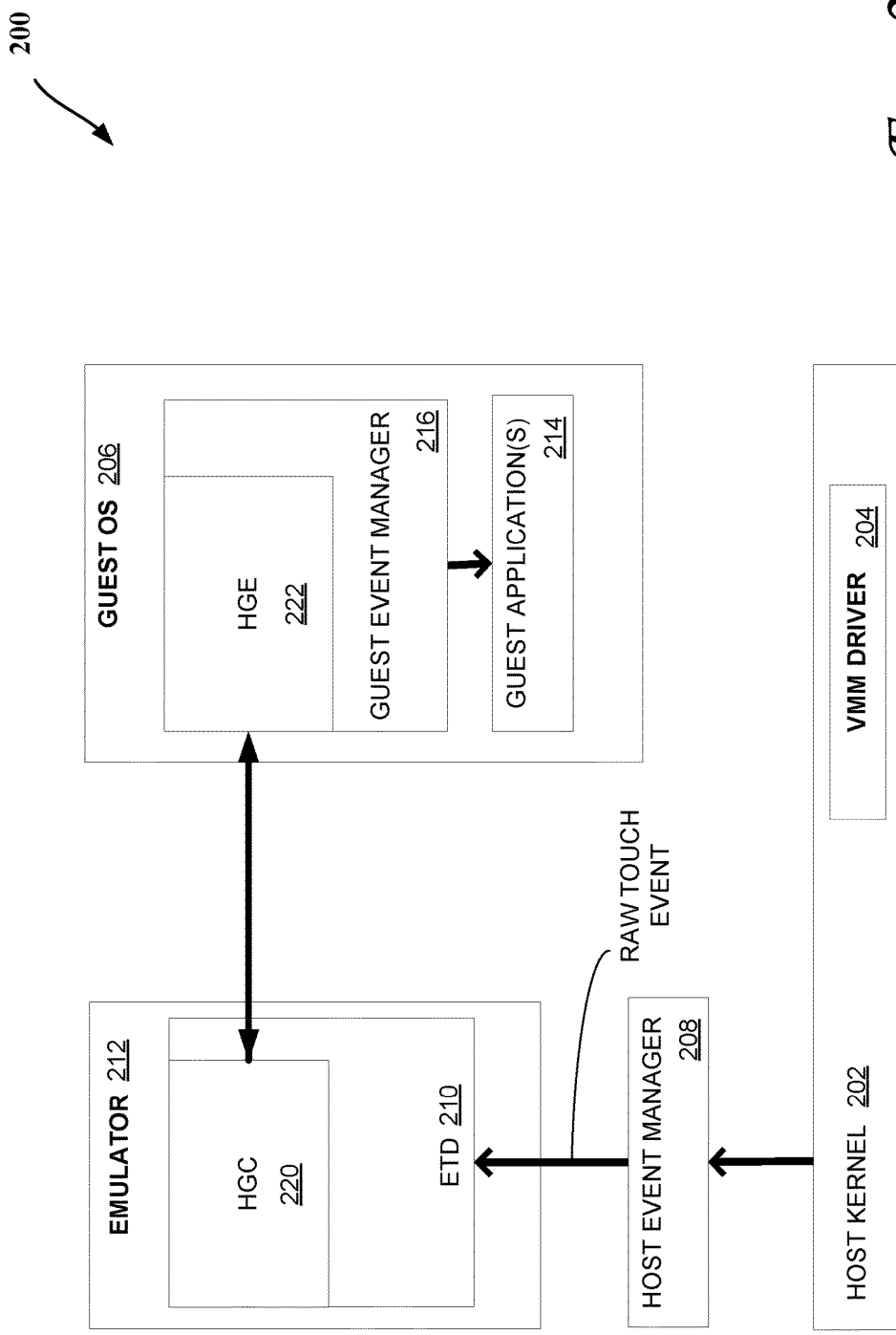
FIG. 2 illustrates a block diagram of components of a system to provide a seamless experience for system gesture(s), according to an embodiment.

FIG. 2 illustrates a block diagram of components of a system 200 to provide a seamless experience for system gesture(s), according to an embodiment. As shown, system 200 includes a host kernel 202 (e.g., with a Virtual Machine Manager (VMM) 204 to support one or more guest OSes 206), a host event manager logic 208 (e.g., to transmit event data (such as system gesture event(s) or raw touch event(s)) from the host kernel 202 to the ETD logic 210 of an emulator logic 212). Also, guest OS 206 may include one or more guest applications 214 and a guest event manager logic 216 (e.g., to manage system gesture events that are detected and communicated to the guest OS 206 from the emulator 212).

To provide a seamless user experience for system gestures, some embodiments utilize a Host Gesture Capturer (HGC) logic 220 (e.g., within the emulator's ETD 210 in host OS) and a Host Gesture Emulator (HGE) logic 222 (e.g., within the event manager 216 of guest OS 206). As shown in FIG. 2, HGC 220 and HGE 222 may exchange command and data between the host (e.g., via the emulator 212) and guest OS 206, as will be further discussed with reference to FIG. 2. When the emulator 212 becomes the foreground application, it requests the host event manager 208 to redirect the raw touch events to the emulator 212 instead of another module in the host system responsible for responding to gestures. In this way, the host will not respond to the system gesture(s), and the emulator 212 becomes responsive and gains full control for responding to system gesture(s). HGC 220 then analyzes the raw touch events and recognizes the system gesture(s). The system gesture(s) may start from the device's screen edge. So, when the HGC 220 receives any raw touch events with coordination close to device's screen edge, the system gesture recognition is triggered in an embodiment. Also, in an embodiment, HGC 220 is implemented as an enhancement to the emulator's ETD 210.

In an embodiment, HGC 220 handles a host system gesture differently according to its nature. For example, if the system gesture is related to host system-wide operations (e.g., invoking the host system menu or returning to host launcher), HGC 220 invokes the host system API (Application Programming Interface) to accomplish these tasks. For system gesture related to a foreground application, HGC 220 may pass the gesture to HGE 222. HGE 220 may be implemented as an enhancement to the guest event manager 216, which emulates the effects of the host system gestures on guest application(s) 214.

Furthermore, if certain gesture effects rely on an application's implementation for the response to the gesture, HGE 222 may translate the host gesture to a guest gesture, and apply the guest gesture to the guest application. If there is no corresponding guest gesture, HGE 222 may respond in a way so that user knows that the gesture is not supported by the guest application, for example, similar to when a host application not supporting a gesture. Additionally, if certain gesture effects do not rely on an application's implementation for the response to the gesture, HGE 222 may emulate the gesture effects independently. For example, HGE 222 may emulate the animation of quitting an application by first shrinking the application to a quarter size and then make it disappear, e.g., similar to when a user apply the gesture to the native host applications.

In some embodiments, HGE 222 passes the detected gesture back to HGC 220, so that HGC could handle the system gesture in the host. Some embodiments may provide various usage cases. Some animation may involve showing the previous application and the last application. For example, Windows® 8 may swipe the current application to a previous or last application. For this kind of gesture, the HGE 222 may track all the guest applications and their last windows surface. When needed, the HGE could retrieve the neighbor application and its windows surface and build an animation. If the current guest application is the first or the last application in guest OS, the HGE may not be able to emulate since its neighbor application is a host application. In this case, the HGE may pass the gesture back to HGC. Upon receiving the gesture, HGC invokes a system API to complete the response. In the Windows 8 swipe example, the emulator application will slide out and be replaced by a neighbor host application. Also, in an embodiment, guest application(s) appear as host application(s) in a system User Interface (UI), e.g., a guest application can be launched from the host launcher (e.g., Windows® 8 start) directly.

Figure 3:
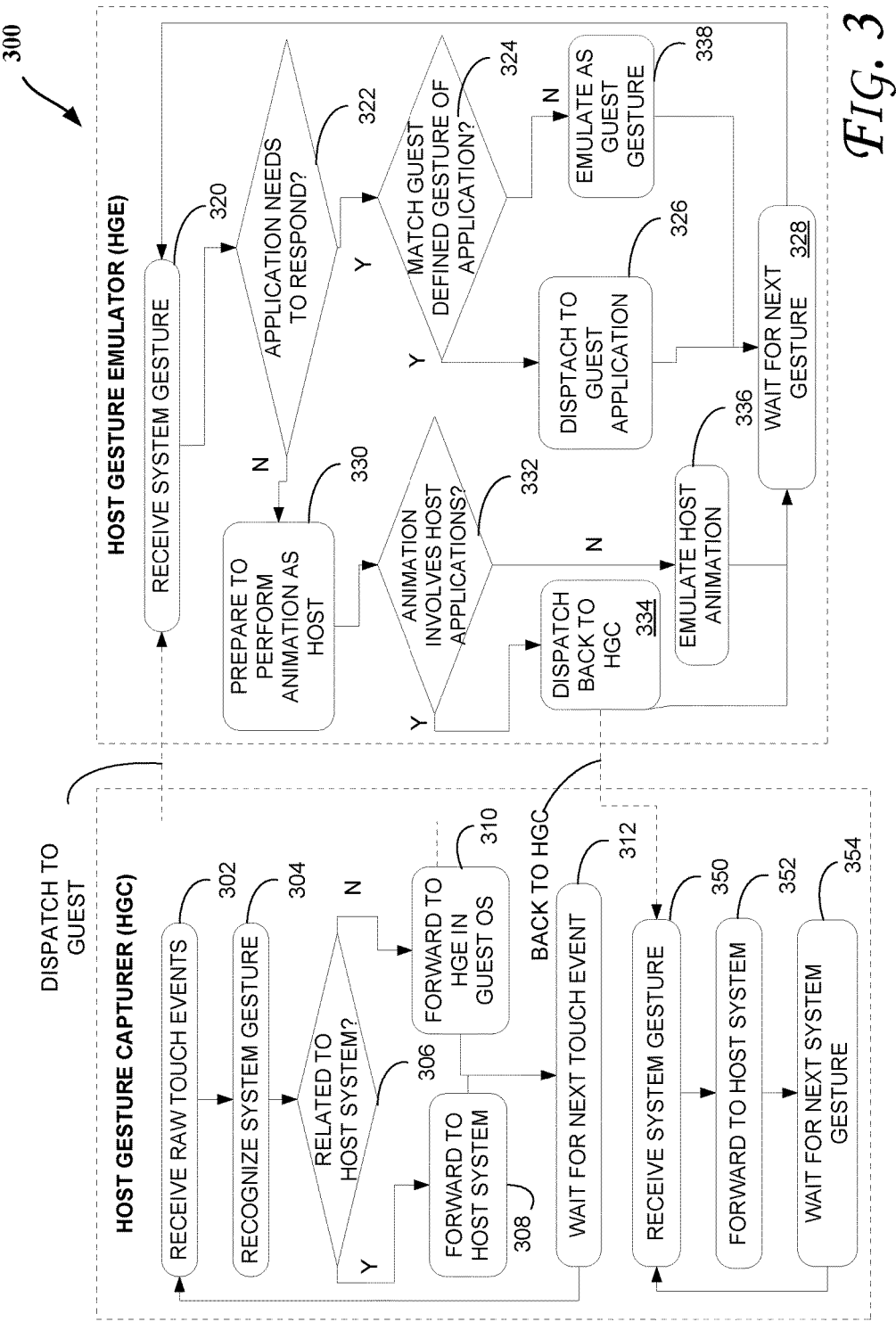
FIG. 3 illustrates a flow diagram of a method to provide a seamless gesture experience on a guest application, according to an embodiment.

FIG. 3 illustrates a flow diagram of a method 300 to utilize the Host Gesture Capture (HGC) and Host Gesture Emulator (HGE) logic of FIG. 2 to provide a seamless gesture experience on a guest application, according to an embodiment. In some embodiments, one or more components of the other figures discussed herein (such as one or more processor cores, display devices, storage devices, etc.) perform one or more operations of FIG. 3. As shown in FIG. 3, operations 302-312 and 350-354 may be performed at HGC 220 of FIG. 2, while operations 320-338 may be performed at HGE 222 of FIG. 2.

Referring to FIGS. 2-3, at an operation 302, a raw (i.e., unprocessed) touch event is received. At an operation 304, the touch event is used to recognize or detect a corresponding system gesture. At an operation 306, it is determined whether the recognized gesture is related to the host system. If so, an operation 308 forwards the gesture to the host system; otherwise, the gesture is forwarded to the HGE at an operation 310.

At an operation 320, the recognized gesture is received at the HGE 222. At an operation 322, it is determined whether a guest application needs to respond to the gesture. If so, an operation 324 determines whether to emulate the gesture by a guest defined gesture and if so, the gesture is dispatched to the corresponding guest application (e.g., the application that is the active application on the screen). After operation 326, method 300 goes to operation 328 which waits for the next gesture, followed by operation 320.

If no response by the application is needed at operation 322, an operation 330 prepares to perform animation as host. If the animation involves host application(s) (at operation 332), the gesture is dispatched back to HGC at operation 334; otherwise (e.g., if a host gesture experience could be emulated independently by guest operating system), the host animation is emulated at an operation 336 and method 300 returns to operation 328. Also, if operation 324 results in a negative determination, then operation 338 is performed (i.e., no response is made), followed by operation 328. At an operation 350, the returned gesture from HGE is received at HGC. The gesture is then forwarded to the host at an operation 352. Operation 354 waits for the next system gesture and method 300 returns to operation 350.

Accordingly, some embodiments introduce a Host Gesture Capturer (HGC) in host OS and a Host Gesture Emulator (HGE) in guest OS. HGC intercepts the raw touch events, recognizes the system gesture, and passes it to HGE. HGC may handle some of the responses for system gestures related to the host system but not to specific application. HGE may emulate the response of system gesture in the guest OS, and call back HGC if needed.

Figure 4:
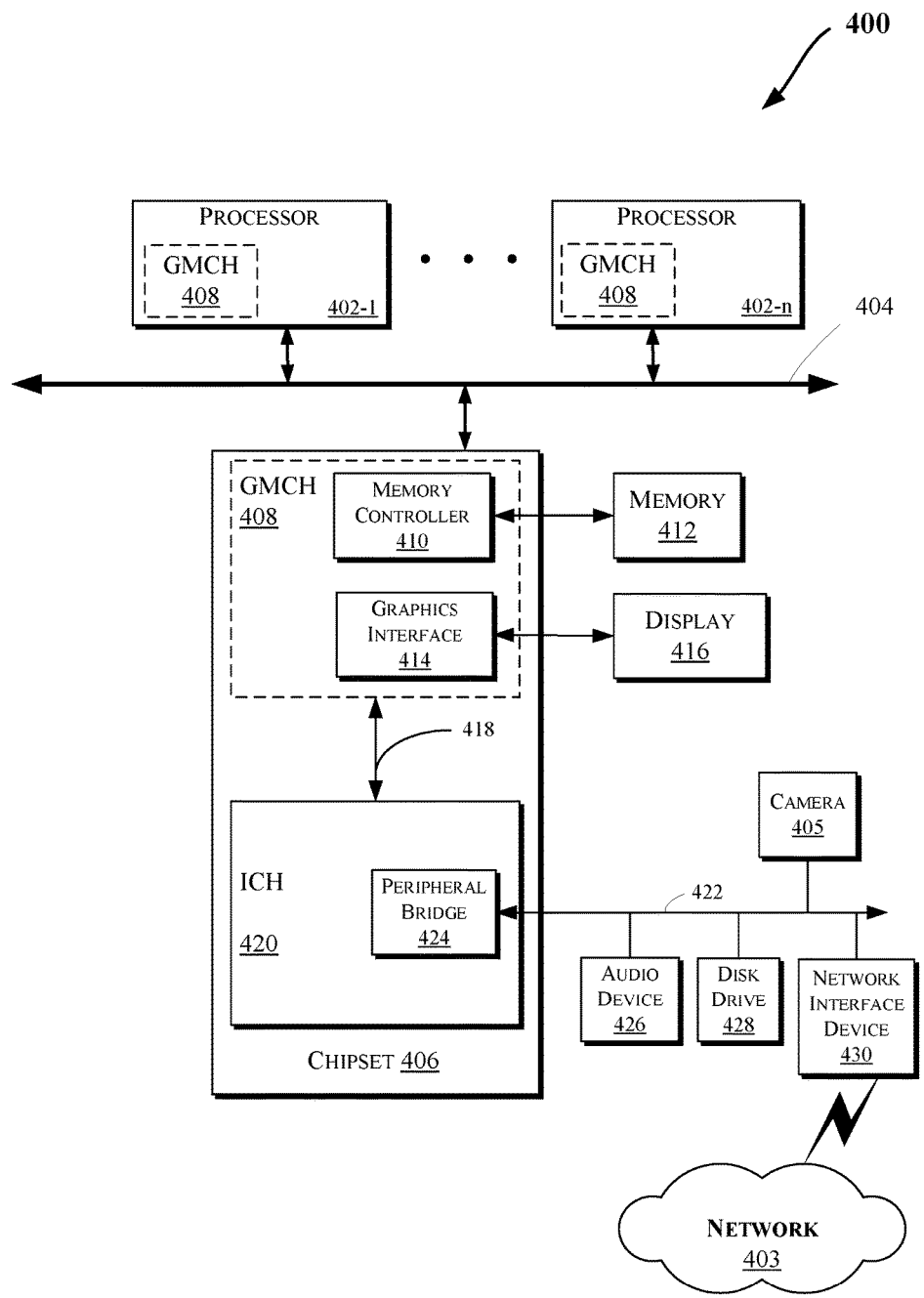
FIGS. 4-6 illustrate block diagrams of embodiments of computing systems, which may be utilized to implement some embodiments discussed herein.

FIG. 4 illustrates a block diagram of a computing system 400 in accordance with an embodiment. The computing system 400 may include one or more central processing unit(s) (CPUs) 402 or processors that communicate via a link 404 (where, as discussed herein, a link may include an interconnect or bus in various embodiments). The processors 402 may include a general purpose processor, a network processor (that processes data communicated over a computer network 403), or other types of a processor (including a reduced instruction set computer (RISC) processor or a complex instruction set computer (CISC)).

Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Additionally, the operations discussed with reference to FIGS. 1-3 may be performed by one or more components of the system 400. Also, various devices discussed with reference to FIGS. 1-3 (such as the desktop, smartphone, tablet, UMPC (Ultra-Mobile Personal Computer), laptop computer, Ultrabook™ computing device, smart watch, smart glasses, etc.) may include one or more of the components of FIG. 4.

For example, memory 412 may store the HGC 220 and HGE 222 discussed with reference to FIGS. 2-3 that are executed on processor(s) 402. Also, system 400 may include an image capture device 405. Moreover, the scenes, images, or frames (e.g., which may be processed by the graphics logic in various embodiments) may be captured by the image capture device 405 (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as display 416, including for example a flat panel display device, etc.).

A chipset 406 may also communicate with the interconnection network 404. The chipset 406 may include a Graphics and Memory Control Hub (GMCH) 408. The GMCH 408 may include a memory controller 410 that communicates with a memory 412. The memory 412 may store data, including sequences of instructions, that may be executed by the processor 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple processors and/or multiple system memories.

The GMCH 408 may also include a graphics interface 414 that communicates with a display device 416. In one embodiment, the graphics interface 414 may communicate with the display device 416 via an accelerated graphics port (AGP) or Peripheral Component Interconnect (PCI) (or PCI express (PCIe) interface). In an embodiment, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O device(s) that communicate with the computing system 400. The ICH 420 may communicate with a link 422 through a peripheral bridge (or controller) 424, such as a peripheral component interconnect (PCI) bridge, a universal serial bus (USB) controller, or other types of peripheral bridges or controllers. The bridge 424 may provide a data path between the processor 402 and peripheral devices. Other types of topologies may be utilized. Also, multiple links may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The link 422 may communicate with an audio device 426, one or more disk drive(s) 428, and a network interface device 430 (which is in communication with the computer network 403). Other devices may communicate via the link 422. Also, various components (such as the network interface device 430) may communicate with the GMCH 408 in some embodiments. In addition, the processor 402 and the GMCH 408 may be combined to form a single chip and/or a portion or the whole of the GMCH 408 may be included in the processors 402 (instead of inclusion of GMCH 408 in the chipset 406, for example). Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., item 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
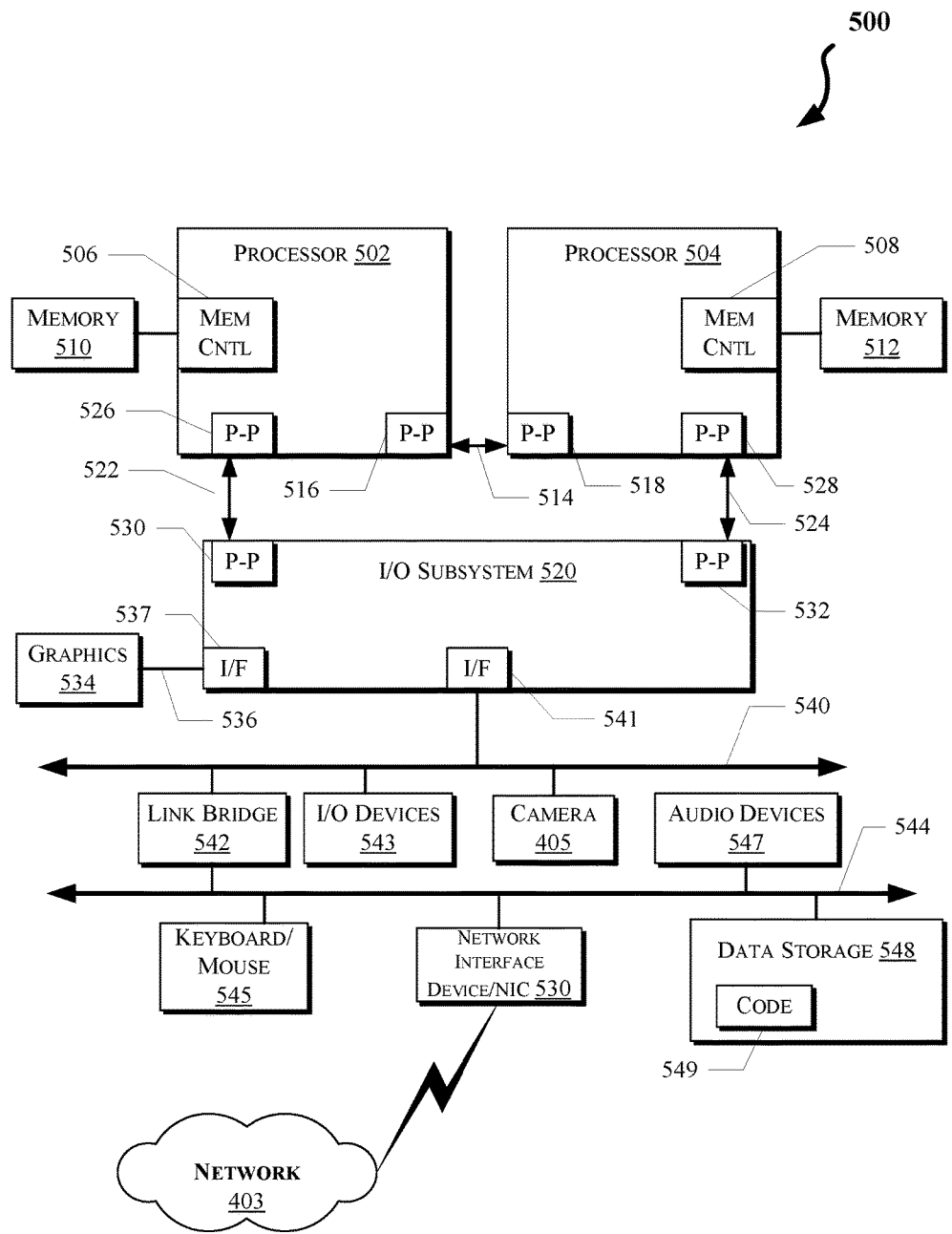

More specifically, FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces.

The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment may be provided within the processors 502 and 504. Also, the operations discussed with reference to FIGS. 1-4 may be performed by one or more components of the system 500. For example, memory 510/512 may store the HGC 220 and HGE 222 discussed with reference to FIGS. 2-3 that are executed on processor(s) 502/504. Also, various devices discussed with reference to FIGS. 1-4 (such as the desktop, smartphone, tablet, UMPC (Ultra-Mobile Personal Computer), laptop computer, Ultrabook™ computing device, smart watch, smart glasses, etc.) may include one or more of the components of FIG. 5. System 500 may further include the image capture device 405.

Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a link 540 using a PtP interface circuit 541. The link 540 may communicate with one or more devices, such as a link bridge 542 and I/O devices 543. Via a link 544, the link bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
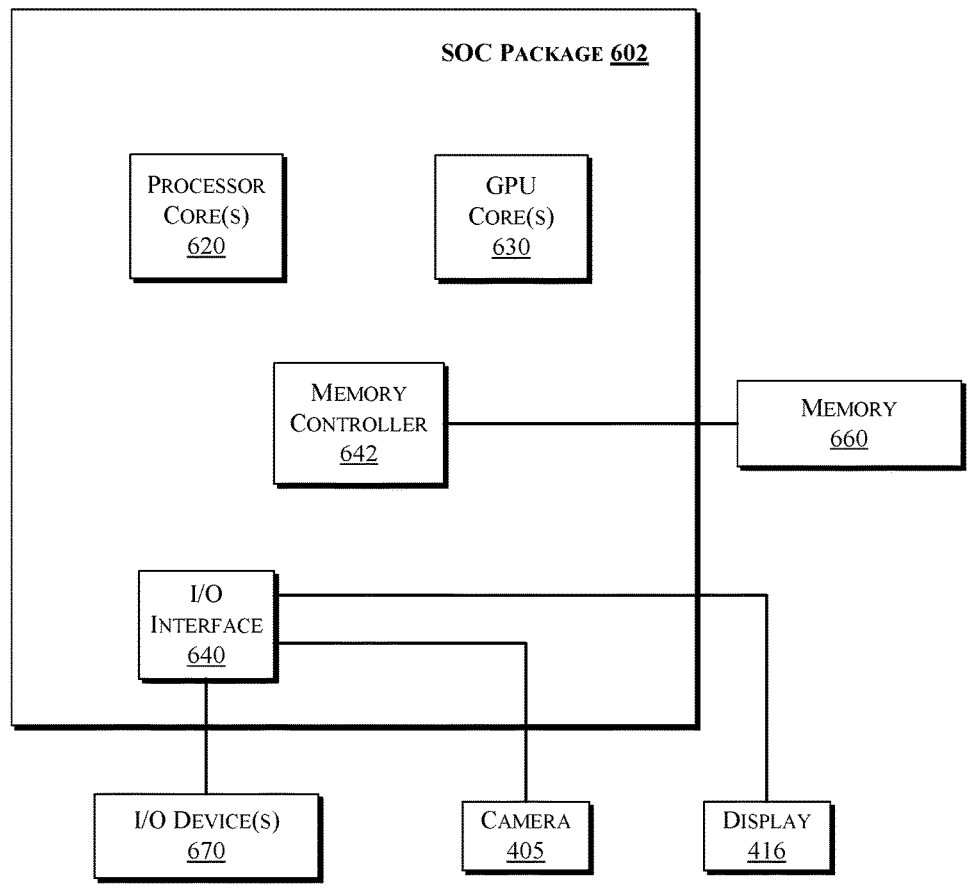

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more processor cores 620 (such as general-purpose processor cores), one or more Graphics Processor Unit (GPU) cores 630, an Input/Output (I/O) interface 640, and a memory controller 642. Various components of the SOC package 602 may be coupled to a link such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via a link such as discussed herein with reference to other figures. I/O device(s) 670 may include one or more of a keyboard, a mouse, a touchpad, a display (e.g., display 416), an image/video capture device (such as a camera or camcorder/video recorder (e.g., camera 405 of FIG. 4 or 5)), a touch screen, a speaker, or the like.

The following examples pertain to further embodiments. Examples may include subject matter such as a method, means for performing acts of the method, at least one machine-readable medium including instructions that, when performed by a machine cause the machine to perform acts of the method, or of an apparatus or system for seamless host system gesture experience for guest applications on touch based devices according to some embodiments and examples described herein.

Example 1 includes an apparatus comprising: Host Gesture Capture (HGC) logic to detect a gesture in response to a touch event, wherein the HGC logic is to forward the gesture to Host Gesture Emulator (HGE) logic in response to a determination that the gesture is unrelated to an operation of a host system, wherein the HGE logic is to operate in accordance with a guest operating system of the host system.

Example 2 includes the apparatus of example 1, wherein the HGE logic is to forward the gesture to a guest application based at least partially on a determination by the HGE logic that there is a guest defined operation of the guest application in response to the gesture.

Example 3 includes the apparatus of any of examples 1 or 2, wherein the guest application is to run on the guest operating system of the host system.

Example 4 includes the apparatus of example 1, wherein the HGE logic is to send the gesture back to the HGC logic based at least partially on a determination by the HGE logic that an animation is to be performed by an application other than those available through the guest operating system in response to the gesture.

Example 5 includes the apparatus of example 1, wherein the HGC logic is to forward the gesture to the host system in response to a determination that the gesture is related to an operation of the host system.

Example 6 includes the apparatus of any of examples 1 to 5, wherein the host system is to comprise a computing device selected from a group comprising: a desktop computer, smartphone, tablet, UMPC (Ultra-Mobile Personal Computer), laptop computer, Ultrabook™ computing device, smart watch, or smart glasses.

Example 7 includes the apparatus of example 1, wherein a host event manager is to redirect the touch event to an emulator that includes the HGC logic instead of another host system component.

Example 8 includes the apparatus of example 7, wherein the emulator is to comprise an emulated touch device logic to forward the gesture to the HGE logic via the HGC logic.

Example 9 includes the apparatus of example 1, wherein the HGC logic is to forward the gesture to the host system based at least partially on a determination that the guest operating system is unable to process the gesture or that the gesture is related to an operation of the host system.

Example 10 includes the apparatus of example 1, wherein the host system is to comprise memory and one or more processor cores that are on a single integrated circuit device.

Example 11 includes the apparatus of any of examples 1 to 10, wherein the HGE is to cause emulation based at least partially on a determination that a host gesture experience could be emulated independently by the guest operating system in response to the gesture.

Example 12 includes a method comprising: detecting a gesture at Host Gesture Capture (HGC) logic in response to a touch event, wherein the HGC logic forwards the gesture to Host Gesture Emulator (HGE) logic in response to a determination that the gesture is unrelated to an operation of a host system, wherein the HGE logic operates in accordance with a guest operating system of the host system.

Example 13 includes the method of example 12, further comprising the HGE logic forwarding the gesture to a guest application based at least partially on a determination by the HGE logic that there is a guest defined operation of the guest application in response to the gesture.

Example 14 includes the method of example 12, further comprising the HGE logic causing emulation based at least partially on a determination by the HGE logic that a host gesture experience could be emulated independently by the guest operating system in response to the gesture.

Example 15 includes the method of example 12, further comprising the HGE logic sending the gesture back to the HGC logic based at least partially on a determination by the HGE logic that an animation is to be performed by an application other than those available through the guest operating system in response to the gesture.

Example 16 includes the method of example 12, further comprising the HGC logic forwarding the gesture to the host system in response to a determination by the HGC logic that the gesture is related to an operation of the host system.

Example 17 includes the method of any of examples 12 to 16, wherein the host system comprises a computing device selected from a group comprising: a desktop computer, smartphone, tablet, UMPC (Ultra-Mobile Personal Computer), laptop computer, Ultrabook™ computing device, smart watch, or smart glasses.

Example 18 includes the method of any of examples 12 to 17, further comprising a host event manager redirecting the touch event to an emulator that includes the HGC logic instead of another host system component.

Example 19 includes the method of example 12, further comprising the HGC logic forwarding the gesture to the host system based at least partially on a determination by the HGC logic that the guest operating system is unable to process the gesture or that the gesture is related to an operation of the host system.

Example 20 includes a computing system comprising: one or more processor cores; memory to store data to be accessed by at least one of the processor cores; Host Gesture Capture (HGC) logic, coupled to at least one of the processor cores, to detect a gesture in response to a touch event, wherein the HGC logic is to forward the gesture to Host Gesture Emulator (HGE) logic in response to a determination that the gesture is unrelated to an operation of a host system, wherein the HGE logic is to operate in accordance with a guest operating system of the host system.

Example 21 includes the system of example 20, wherein the HGE logic is to forward the gesture to a guest application based at least partially on a determination by the HGE logic that there is a guest defined operation of the guest application in response to the gesture.

Example 22 includes the system of example 20, wherein the HGE logic is to cause emulation based at least partially on a determination by the HGE logic that a host gesture experience could be emulated independently by the guest operating system in response to the gesture.

Example 23 includes the system of example 20, wherein the HGE logic is to send the gesture back to the HGC logic based at least partially on a determination by the HGE logic that an animation is to be performed by an application other than those available through the guest operating system in response to the gesture.

Example 24 includes an apparatus comprising means for performing a method as set forth in any one of examples 12 to 19.

Example 25 Machine-readable storage including machine-readable instructions, when executed, to implement a method or realize an apparatus as set forth in any one of examples 12 to 19.

Example 26 includes at least one computer-readable medium comprising one or more instructions that when executed on a processor cause the processor to perform the method as recited in any of examples 12-19.

Example 27 includes an apparatus to provide seamless host system gesture experience for guest applications on touch based devices, the apparatus comprising: means for detecting a gesture at Host Gesture Capture (HGC) logic in response to a touch event, wherein the HGC logic is to forward the gesture to Host Gesture Emulator (HGE) logic in response to a determination that the gesture is unrelated to an operation of a host system, wherein the HGE logic is to operate in accordance with a guest operating system of the host system.

Example 28 includes the apparatus of example 27, further comprising means for forwarding the gesture to a guest application based at least partially on a determination that there is a guest defined operation of the guest application in response to the gesture.

Example 29 includes the apparatus of example 27, further comprising means for causing emulation based at least partially on a determination that a host gesture experience is to be emulated independently by the guest operating system in response to the gesture.

Example 30 includes the apparatus of example 27, further comprising means for sending the gesture back to the HGC logic based at least partially on a determination that an animation is to be performed by an application other than those available through the guest operating system in response to the gesture.

Example 31 includes the apparatus of example 27, further comprising means for forwarding the gesture to the host system in response to a determination that the gesture is to be related to an operation of the host system.

Example 32 includes the apparatus of example 27, wherein the host system is to comprise a computing device selected from a group comprising: a desktop computer, smartphone, tablet, UMPC (Ultra-Mobile Personal Computer), laptop computer, Ultrabook™ computing device, smart watch, or smart glasses.

Example 33 includes the apparatus of any of examples 27 to 32, further comprising means for redirecting the touch event to an emulator that is to include the HGC logic instead of another host system component.

Example 34 includes the apparatus of example 27, further comprising means for forwarding the gesture to the host system based at least partially on a determination that the guest operating system is to be unable to process the gesture or that the gesture is to be related to an operation of the host system.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible (such as a non-transitory) machine-readable or computer-readable medium having stored thereon instructions (or software procedures) used to program a computer to perform a process discussed herein. The machine-readable medium may include a storage device such as those discussed with respect to FIGS. 1-6 (including, for example, ROM, RAM, flash memory, hard drive, solid state drive, etc.).

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a link, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
Host Gesture Capture (HGC) circuitry to receive a system gesture from a touch-based mobile device, wherein the system gesture is to be detected in response to a touch event at the touch-based mobile device,
wherein the HGC circuitry is to forward the gesture to Host Gesture Emulator (HGE) logic in response to a determination that the system gesture is unrelated to an operation of a host system, wherein the HGE logic is to operate in accordance with a guest operating system of the host system, wherein the system gesture is to be forwarded to a guest application, based at least partially on a determination that there is a guest defined operation of the guest application in response to the system gesture, to allow the guest application to respond to host system gestures instead of the host system, wherein in response to a determination that there is no corresponding guest defined operation of the guest application for the system gesture, the HGE logic is to emulate the system gesture as a guest gesture, wherein the touch-based mobile device comprises both the HGC circuitry and the HGE logic.

2. The apparatus of claim 1, wherein the HGE logic is to forward the gesture to the guest application based at least partially on a determination by the HGE logic that there is the guest defined operation of the guest application in response to the gesture.

3. The apparatus of claim 2, wherein the guest application is to run on the guest operating system of the host system.

4. The apparatus of claim 1, wherein the HGE logic is to send the gesture back to the HGC circuitry based at least partially on a determination by the HGE logic that an animation is to be performed by an application other than those available through the guest operating system in response to the gesture.

5. The apparatus of claim 1, wherein the HGC circuitry is to forward the gesture to the host system in response to a determination by the HGC circuitry that the gesture is related to an operation of the host system.

6. The apparatus of claim 1, wherein the host system is to comprise a computing device selected from a group comprising: a desktop computer, smartphone, tablet, UMPC (Ultra-Mobile Personal Computer), laptop computer, Ultrabook™ computing device, smart watch, or smart glasses.

7. The apparatus of claim 1, wherein a host event manager is to redirect the touch event to an emulator that includes the HGC circuitry instead of another host system component.

8. The apparatus of claim 7, wherein the emulator is to comprise an emulated touch device logic to forward the gesture to the HGE logic via the HGC circuitry.

9. The apparatus of claim 1, wherein the HGC circuitry is to forward the gesture to the host system based at least partially on a determination by the HGC circuitry that the guest operating system is unable to process the gesture or that the gesture is related to an operation of the host system.

10. The apparatus of claim 1, wherein the host system is to comprise memory and one or more processor cores that are on a single integrated circuit device.

11. The apparatus of claim 1, wherein the HGE logic is to cause emulation based at least partially on a determination by the HGE logic that a host gesture experience could be emulated independently by the guest operating system in response to the gesture.

12. A method comprising:
receiving a system gesture from a touch-based mobile device, wherein the system gesture is detected at Host Gesture Capture (HGC) circuitry in response to a touch event at the touch-based mobile device,
wherein the HGC circuitry forwards the gesture to Host Gesture Emulator (HGE) logic in response to a determination that the system gesture is unrelated to an operation of a host system, wherein the HGE logic operates in accordance with a guest operating system of the host system, wherein the system gesture is forwarded to a guest application, based at least partially on a determination that there is a guest defined operation of the guest application in response to the system gesture, to allow the guest application to respond to host system gestures instead of the host system, wherein in response to a determination that there is no corresponding guest defined operation of the guest application for the system gesture, the HGE logic emulates the system gesture as a guest gesture, wherein the touch-based mobile device comprises both the HGC circuitry and the HGE logic.

13. The method of claim 12, further comprising the HGE logic forwarding the gesture to the guest application based at least partially on a determination by the HGE logic that there is the guest defined operation of the guest application in response to the gesture.

14. The method of claim 12, further comprising the HGE logic causing emulation based at least partially on a determination by the HGE logic that a host gesture experience could be emulated independently by the guest operating system in response to the gesture.

15. The method of claim 12, further comprising the HGE logic sending the gesture back to the HGC circuitry based at least partially on a determination by the HGE logic that an animation is to be performed by an application other than those available through the guest operating system in response to the gesture.

16. The method of claim 12, further comprising the HGC circuitry forwarding the gesture to the host system in response to a determination by the HGC circuitry that the gesture is related to an operation of the host system.

17. The method of claim 12, wherein the host system comprises a computing device selected from a group comprising: a desktop computer, smartphone, tablet, UMPC (Ultra- Mobile Personal Computer), laptop computer, Ultrabook™ computing device, smart watch, or smart glasses.

18. The method of claim 12, further comprising a host event manager redirecting the touch event to an emulator that includes the HGC circuitry instead of another host system component.

19. The method of claim 12, further comprising the HGC circuitry forwarding the gesture to the host system based at least partially on a determination by the HGC circuitry that the guest operating system is unable to process the gesture or that the gesture is related to an operation of the host system.

20. A computing system comprising:
one or more processor cores;
memory to store data to be accessed by at least one of the processor cores;
Host Gesture Capture (HGC) circuitry, coupled to at least one of the processor cores, wherein at least a portion of the HGC circuitry is in hardware, to receive a system gesture from a touch-based mobile device, wherein the system gesture is to be detected in response to a touch event at the touch-based mobile device,
wherein the HGC circuitry is to forward the gesture to Host Gesture Emulator (HGE) logic in response to a determination that the system gesture is unrelated to an operation of a host system, wherein the HGE logic is to operate in accordance with a guest operating system of the host system, wherein the system gesture is to be forwarded to a guest application, based at least partially on a determination that there is a guest defined operation of the guest application in response to the system gesture, to allow the guest application to respond to host system gestures instead of the host system, wherein in response to a determination that there is no corresponding guest defined operation of the guest application for the system gesture, the HGE logic is to emulate the system gesture as a guest gesture, wherein the touch-based mobile device comprises both the HGC circuitry and the HGE logic.

21. The system of claim 20, wherein the HGE logic is to forward the gesture to the guest application based at least partially on a determination by the HGE logic that there is the guest defined operation of the guest application in response to the gesture.

22. The system of claim 20, wherein the HGE logic is to cause emulation based at least partially on a determination by the HGE logic that a host gesture experience could be emulated independently by the guest operating system in response to the gesture.

23. A non-transitory computer-readable medium comprising one or more instructions that when executed on a processor configure the processor to perform one or more operations to:
receive a system gesture from a touch-based mobile device, wherein the system gesture is detected at Host Gesture Capture (HGC) circuitry in response to a touch event at the touch-based mobile device,
wherein the HGC circuitry forwards the gesture to Host Gesture Emulator (HGE) logic in response to a determination that the system gesture is unrelated to an operation of a host system, wherein the HGE logic operates in accordance with a guest operating system of the host system, wherein the system gesture is forwarded to a guest application, based at least partially on a determination that there is a guest defined operation of the guest application in response to the system gesture, to allow the guest application to respond to host system gestures instead of the host system, wherein in response to a determination that there is no corresponding guest defined operation of the guest application for the system gesture, the HGE logic is to emulate the system gesture as a guest gesture, wherein the touch-based mobile device comprises both the HGC circuitry and the HGE logic.

24. The non-transitory computer-readable medium of claim 23, further comprising one or more instructions that when executed on the processor configure the processor to perform one or more operations to cause the HGE logic to forward the gesture to the guest application based at least partially on a determination by the HGE logic that there is the guest defined operation of the guest application in response to the gesture.

25. The non-transitory computer-readable medium of claim 23, further comprising one or more instructions that when executed on the processor configure the processor to perform one or more operations to cause an emulation based at least partially on a determination by the HGE logic that a host gesture experience could be emulated independently by the guest operating system in response to the gesture.

* * * * *